Patented Dec. 11, 1951

2,578,054

UNITED STATES PATENT OFFICE 2,578,054

EXTRACTIVE CRYSTALLIZATION PROCESS

Lloyd C. Fetterly, Seattle, Wash., assignor to Shell Development Company, San Francisco, Calif., a corporation of Delaware No Drawing. Application December 13, 1947, Serial No. 791,659

11 Claims. (Cl. 260—666)

This invention relates to a process for the extractive crystallization of hydrocarbons. More particularly it relates to improvements in the process for the formation of complexes between certain agents and hydrocarbons and to applications of such an improved process.

The fractionation of mixtures of hydrocarbons may be conducted by such means as distillation, adsorption and fractional crystallization. However, many mixtures, such as those of petroleum hydrocarbons, are separated into desired fractions only with difficulty, particularly where fractionation into structural types is desired rather than separation according to boiling point.

A recent method has been investigated for the fractionation of mixtures of organic compounds with special reference to the separate recovery of aromatics, branched hydrocarbons, unbranched hydrocarbons and naphthenes from mixtures containing them. Briefly, this method comprises contacting the mixtures with a selective crystallizing agent which forms crystalline complexes with a particular fraction of the mixture. The agents suitable for this process are urea and thiourea. It has been noted that each of these agents forms crystalline complexes with a special type of configuration as more fully described hereinafter.

An important phenomenon of this process comprises the expiration of time from the initial moment of contacting the hydrocarbons with a crystallizing agent and the first appearance of crystalline complexes. Various influences have an important effect upon the duration of this period, which hereinafter will be referred to as the induction period. The presence of substances inert toward the complex forming agent ordinarily lengthen the induction period roughly in direct ratio to their concentration in the mixture. The temperature of the reaction likewise has an important effect upon the induction period, lowering the temperature often being needed to promote reasonably rapid complex formation. The rate and means of agitation also is an important factor in the determination of the induction period. High degree of speed agitation favors crystallization of the complexes. Another important factor in determination of the induction period is the type of hydrocarbon being treated with the complex forming agent. For example, it has been noted that the higher molecular weight varieties have a considerably shorter induction period, other reaction conditions remaining constant.

The length of the induction period becomes especially important when this process is to be used in large scale industrial applications since the size of equipment and the operation of other steps in the process depend in large extent upon its length. Therefore, any means of shortening the period is of practical value in increasing the capacity of plant equipment, and in reducing losses due to such reasons as decomposition of the reactants.

The complex forming agents used in the present process are reasonably stable but, especially in the presence of water or under the influence of heat, agents such as urea tend to be decomposed or converted to other products, some of which have been found to have a deleterious effect on operation of the process. For example, urea is converted to a small extent into ammonium carbonate which in turn decomposes to form free ammonia. This is particularly true if the temperature of reaction of regeneration is high, if dilute urea solutions are employed or if extended process periods are required. A preferred means of operating this process comprises formation of complexes, their separation from the reaction mixture, regeneration of the agent and the hydrocarbon in complex formation with it, and subsequent re-use of the agent in the formation of further complexes. Under these conditions the agent is repeatedly subject to the above influences which promote decomposition and, unless special precautions are employed, the decomposition products build up in the system to the detriment of the process.

It is an object of this invention to improve the process of formation of crystalline complexes between the stated agents and reactive hydrocarbons. It is another object of this invention to reduce the length of the induction period. It is a third object of this invention to make the present process applicable to the fractionation of mixtures to which the process could not formerly be applied. Other objects will become apparent during the following discussion.

Now, in accordance with this invention, it has been found that the rate of complex formation between hydrocarbons and urea or thiourea is substantially increased by maintaining the system at a pH below about 9.5. This may be done either by the positive addition of acidic substances to the system, by the depression of the formation of basic substances, or by the removal of basic substances from the system. Again in accordance with this invention, it has been found that the crystals obtained when employing a pH below about 9.5 have better filtration characteristics than when a higher pH is used.

As outlined above, each of the specific agents to which the present process applies forms crystalline complexes with compounds having a particular type of configuration, to the exclusion of other types which may be present in a mixture. Urea has been found to form crystalline complexes with hydrocarbons having substantially unbranched carbon chains. Under most conditions urea will not form complexes with hydrocarbons having other types of structures such as branched chain molecules or cyclic structures. Thiourea, on the other hand, has been found to form crystalline complexes with hydrocarbons having branched configuration or at least having one substituent of branched structure. Thiourea also forms crystalline complexes with naphthenes. It will be noted that neither of these two types of structures are affected by urea and hence mixtures of normal hydrocarbons together with branched hydrocarbons and naphthenes are conveniently separated by the application of one or both of these agents.

Suitable hydrocarbons which form crystalline complexes with urea include the paraffinic hydrocarbons such as butane, pentane, hexane, heptane, octane, nonane, decane, undecane, dodecane, tridecane, tetradecane, pentadecane, hexadecane, heptadecane, octadecane, nonadecane, eicosane, etc.

Olefin hydrocarbons which may be treated by the process of the present invention include 1-butene, 2-butene, 1-pentene, 2-pentene, 1-hexene, 2-hexene, 3-hexene, 1-heptene, 2-heptene, 3-heptene, 1-octene, 2-octene, 3-octene, 4-octene, 2-nonene, 2-nonene, 4-nonene, 1-decene, 2-decene, 3-decene, 5-decene, 1-undecene, 2-undecene, 5-undecene, 1-dodecene, 6-dodecene, 1-tridecene, 6-tridecene, 1-pentadecene, 8-heptadecene, 13-heptacosene, etc.

Another class of hydrocarbons which may be formed into complexes with urea, according to the process of the present invention are the normal diolefins such as 1,2-butadiene, 1,3-butadiene, 1,2-pentadiene, 1,3-pentadiene, 1,4-pentadiene, 1,2-hexadiene, 1,3-hexadiene, 1,4-hexadiene, 1,5-hexadiene, 2,3-hexadiene, 2,4-hexadiene, 1,3-heptadiene, 1,6-heptadiene, 2,4-heptadiene, 1,4-octadiene, 1,5-octadiene, 1,7-octadiene, 2,6-octadiene, 3,5-octadiene, 1,5-nonadiene, 1,8-nonadiene, 2,6-nonadiene, 1,3-decadiene, 1,4-decadiene, 1,9-decadiene, 2,8-decadiene, 3,7-decadiene, 2,6-dodecadiene, 1,17-octadecadiene, etc.

Normal hydrocarbons of a greater degree of unsaturation which form crystalline complexes with urea by the process of the present invention include the triolefines, acetylenes, diacetylenes, olefin-acetylenes and the diolefin-acetylenes, including 1,3,5-hexatriene, 1,3,5-heptatriene, 2,4,6-octatriene, ethylacetylene, propylacetylene, butylacetylene, amylacetylene, caprylidene, 4-octyne, diacetylene, propyl-diacetylene, 1,8-nonadiyne, 1-hepten-3-yne, 1,5-hexadien-3-yne, etc.

The mixtures containing the hydrocarbons of normal structure may be composed solely of mixed normal hydrocarbons, or they may contain materials substantially inert toward urea, such as branched paraffins, iso-olefins, aromatics, cycloparaffins, etc. Usually, especially when treating natural products such as petroleum, the inert ingredients are present as isomers of the normal structure hydrocarbons, and may occur therewith naturally or by reason of some treatment to which the hydrocarbons have been subjected, such as alkylation, cyclization, isomerization, etc. However, active or inert diluents or solvents may be added to normal hydrocarbons in order to modify the type and degree of crystallization of the latter with urea. The reason for and use of diluents is discussed hereinafter.

Hydrocarbons which form complexes with thiourea are those having a predominating member which is a substantially branched radical or a naphthene radical, such as alkaryl hydrocarbons wherein at least one alkyl group is an isoparaffin radical of about six or more carbon atoms.

Isoparaffins which form complexes with thiourea include isobutane, isopentane, 2,2-dimethylpropane, isohexane, 2,3-dimethylbutane, 2-methylpentane, 3-methylpentane, 2-ethylbutane, 2-ethylpropane, 1,1-dimethylpentane, 1,2-dimethylpentane, 1,3-dimethylpentane, 1,4-dimethylpentane, 2-ethylpentane, 3-ethylpentane, 2-n-propylbutane, 2-isopropylbutane, 2-methylhexane, 3-methylhexane, 2,2-dimethylpentane, 2,3-dimethylpentane, 2,4-dimethylpentane, 3,3-dimethylpentane, 2,2,3-trimethylbutane, 2-methylheptane, 3-methylheptane, 4-methylheptane, 3-ethylhexane, 2,2-dimethylhexane, 2,3-dimethylhexane, 2,4-dimethylhexane, 2,5-dimethylhexane, 3,3-dimethylhexane, 3,4-dimethylhexane, 2,2,3-trimethylheptane, 2,2,4-trimethylpentane, 2,3,3-trimethylpentane, 2,3,4-trimethylpentane, 2,2,3,3-tetramethylbutane, 2-methyl-3-ethylpentane, 3-methyl-3-ethylpentane, 2-methyloctane, 3-methyloctane, 4-methyloctane, 2,2-dimethylheptane, 2,3-dimethylheptane, 2,4-dimethylheptane, 2,5-dimethylheptane, 2,6-dimethylheptane, 3,3-dimethylheptane, 3,4-dimethylheptane, 3-ethylheptane, 4-ethylheptane, 2,2,3-trimethylhexane, 2,2,4 - trimethylhexane, 2,2,5 - trimethylhexane, 2,3,3 - trimethylhexane, 2,3,5 - trimethylhexane, 2,4,4-trimethylhexane, 3,3,4-trimethylhexane, 2-methyl-3-ethylhexane, 2-methyl-4-ethylhexane, 2,2,3,3-tetramethylheptane, 2,2,4,4-tetramethylpentane, 3,3-diethylpentane, 2,2-dimethyl-3-ethylpentane, 2,3-dimethyl-3-ethylpentane, 2,4-dimethyl - 3 - ethylpentane, 2,4 - dimethyl-3-ethylpentane, 2,2,3,4-tetramethylpentane, 2-methylnonane, 3-methylnonane, 4-methylnonane, 5-methylnonane, 2,2-dimethyloctane, 2,3-dimethyloctane, 2,4-dimethyloctane, 2,5-dimethyloctane, 2,6-dimethyloctane, 2,7-dimethyloctane, 3,3-dimethyloctane, 3,4-dimethyloctane, 3,6-dimethyloctane, 4,5-dimethyloctane, 3-ethyloctane, 2,2,3-trimethylheptane, 2,3,3-trimethylheptane, 2,2,6-trimethylheptane, 2,3,6-trimethylheptane, 2,4,4-trimethylheptane, 2,4,6-trimethylheptane, 3,3,5-trimethylheptane, 3-methyl-3-ethylheptane, 4-propylheptane, 4-isopropylheptane, 2,2,3,3-tetramethylhexane, 2,2,3,4-tetramethylhexane, 2,2,5,5-tetramethylhexane, 2,2,-dimethyl-4-ethylhexane, 3,3,4,4 - tetramethylhexane, 3,3 - diethylhexane, 3,4-diethylhexane, 2,2,4-trimethylheptane, 2,2,4,5-tetramethylhexane, 2-methyl-5-ethylheptane, 4-methyldecane, 5-methyldecane, 2,3-dimethylnonane, 2,4-dimethylnonane, 2,5-dimethylnonane, 2,6-dimethylnonane, 3,3-dimethylnonane, 4-ethylnonane, 5-ethylnonane, 2,3,7-trimethyloctane, 2,4,7 - trimethyloctane, 2,2,3,3 - tetramethylheptane, 2,2,4-trimethyloctane, 2,2,4,6-tetramethylheptane, 2,2,4,5-tetramethylheptane, 3-methylundecane, 4-methylundecane, 2,3-dimethyldecane, 2,5-dimethyldecane, 2,6-dimethyldecane, 2,9-dimethyldecane, 3-ethyldecane, 5-propylnonane, 2,2,7,7-tetramethyloctane, 2,3,6,7-tetramethyloctane, 2,4,5,7 - tetramethyloctane, 3,3,6,6 - tetramethyloctane, 2-methyl-5-propyloctane, 3,6-diethyloctane, 2,6-dimethyl-3-isopropylheptane, 4,5-diethyloctane, 2,2,4,6,6-pentamethylheptane, 2,2,4,4,6-pentamethylheptane, 5-methyldodecane, 2,10-dimethylundecane, 2,5,9-trimethyldecane, 4-propyldecane, 4-ethylundecane, 5-butylnonane, 2,11-dimethyldodecane, 4,5-diisopropyloctane, 2,7-dimethyl-4,5-diethyloctane, 4-propylundecane, 2,7-dimethyl-4-isobutyloctane, 2,6,10-trimethyldodecane, 2,6,11-trimethyldodecane, 6-methyl-7-ethyldodecane, 5-propyldodecane, 6-propyldodecane, 4-methyl-6-propylundecane, 6,9-dimethyltetradecane, 7,8-dimethyltetradecane, 3-ethyltetradecane, 5,7-diethyldodecane, 2,6,7,11-tetramethyldodecane, 4,7-dipropyldecane, 2,2,3,3,6,6,7,7-octamethyloctane, 3,12-diethyltetradecane, 2,6,11-trimethyl-9-isobutyldodecane, 2,6-dimethyloctadecane, 5,7,9-triethyltetradecane, 2-methyl-4-isobutylhexadecane, 2,9-dimethyl-5,6-diisoamyldecane, 4,8,13,17-tetramethylicosane, 2,11-dimethyl-5,8-diisoamyldodecane, 10-nonyl-nonadecane, 2,6,10,14,18,22-hexamethyltetracosane, 2,6,12,16-tetramethyl-9-(2,6-dimethyloctyl) heptadecane, etc.

As stated hereinbefore, another type of hydrocarbon which readily forms complexes with thiourea is that of the naphthenes. Typical species of this group include cyclopropane, methylcyclopropane, 1,1-dimethylcyclopropane, 1,2-dimethylpropane, ethylcyclopropane, 1,1,2-trimethylcyclopropane, 1,2,3-trimethylcyclopropane, 1-methyl-2-ethylcyclopropane, propylcyclopropane, 1-methyl-2-propylcyclopropane, cyclobutane, methylcyclobutane, ethylcyclobutane, 1,2-dimethylcyclobutane, propylcyclobutane, isopropylcyclobutane, 1,2-diisopropylcyclobutane, 1,2-dimethyl-3,4-diethylcyclobutane, 1,1,2,2-tetramethyl-3,4-diisopropylcyclobutane, cyclopentane, methylcyclopentane, 1,1-dimethylcyclopentane, 1,2-dimethylcyclopentane, 1,3-dimethylcyclopentane, ethylcyclopentane, propylcyclopentane, isopropylcyclopentane, 1,1,3-trimethylcyclopentane, 1-methyl-2-ethylcyclopentane, 1-methyl-3-ethylcyclopentane, butylcyclopentane, isobutylcyclopentane, 1-methyl-2-propylcyclopentane, 1-methyl-3-propylcyclopentane, 1,3-dimethyl-2-ethylcyclopentane, 1,3-dimethyl-5-ethylcyclopentane, 1,1-diethylcyclopentane, amylcyclopentane, isoamylcyclopentane, 2-cyclopentylpentane, 1-methyl-3-butylcyclopentane, 1-methyl-2,5-diethylcyclopentane, 1,2,3-trimethyl-4-isopropylcyclopentane, heptylcyclopentane, cyclohexane, methylcyclohexane, ethylcyclohexane, 1,1-dimethylcyclohexane, 1,2-dimethylcyclohexane, 1,3-dimethylcyclohexane, 1,2,3-trimethylcyclohexane, 1,3,5-trimethylcyclohexane, butylcyclohexane, 1-methyl-4-ethylcyclohexane, 1-methyl-3-propylcyclohexane, 1-methyl-3-isopropylcyclohexane, 1,3-dimethyl-5-ethylcyclohexane, 1,3-diethylcyclohexane, amylcyclohexane, pentamethylcyclohexane, 1,2-dimethyl-3,6-diethylcyclohexane, 4-cyclohexylheptane, 3-cyclohexyl-3-ethylpentane, triisopropylcyclohexane, 2,8-dimethyl-5-ethyl-5-cyclohexylnonane, 1-methyl-4-isopropyl-2-dodecylcyclohexane, octadecylcyclohexane, propylcycloheptane, etc.

As indicated in the statement of the invention given hereinbefore, the maintenance of a pH below about 9.5 decreases the length of the induction period appreciably. Specific instances of this will be found in the examples. The reduction of a high pH or the maintenance of a pH below 9.5 may be effected by any one or a combination of the following three means, namely neutralization, removal of basic substances from the system and depression of the formation of basic substances.

Neutralization is conveniently carried out with acids of either mineral or organic nature. Suitable inorganic acids include hydrochloric, nitric, phosphoric or sulfuric acids. Organic acids are suitable and the fatty acids such as formic or acetic are preferred. However, aromatic acids such as benzoic acid or other types such as sulfonic acids and hydroxy fatty acids may be employed. These may be added to the system either prior to or during complex formation or during a regeneration step when the complex forming agent is being prepared for further use. For example, if the agent, such as urea, is to be used in aqueous solution, the pH of the solution may be initially reduced by the addition of acids at any time prior to or during operation of the process. Dependent upon the nature of the process and the physical characteristics of the acid, the neutralizing agent may be added as a solution, as a liquid, as a solid or as a gas. Preferably, sufficient acid is always present in the system to keep the pH at all times below about 9.5, but no advantage appears to be gained by reducing the pH below about 3.0. A preferred range is from 5.0 to 8.0, since within this range the induction period is held to a minimum. Still more preferably, the range should be restricted to between pH 5 and pH 7.

A second means of maintaining a pH below about 9.5 in the system comprises removal of the basic substances from the system by means other than neutralization, namely volatilization or precipitation. Ammonium carbonate has a relatively low vapor pressure and may be removed from the system conveniently under vacuum at relatively low temperatures either during the process of complex formation, or more preferred, during a separation or regeneration step as more fully described hereinafter. Ammonia is even more conveniently removed by the same method. Precipitation means may be employed by adjusting the component of the reaction mixture so that basic substances introduced into or formed in the mixture precipitate and may be removed by such means as filtration.

A third and sometimes less convenient means of maintaining the pH of the system below about 9.5 comprises depression of the formation of basic impurities. This may be carried out by the use of low reaction temperatures, by employing highly concentrated solutions of the complex forming agent and by maintaining a minimum process time.

The process in which the present invention is employed inherently involves the following general features: Contacting, whereby the complex forming agent and the hydrocarbons are brought together; complex formation, wherein the complexes separate from the other components of the reaction mixture in crystalline form; separation, wherein the crystalline complexes are removed from the other ingredients of the reaction mixture; and, if desired, regeneration, whereby the complex forming agent is regenerated in its original state from the hydrocarbon with which it is combined in the complex.

Contact of the agent and the hydrocarbons may be conducted with or without the presence of an inert diluent for the latter component. Diluents which may be used include water, alcohol, inert hydrocarbons and polar compounds such as methylisobutyl ketone. The use of diluents is desirable where the hydrocarbon to be treated is a solid or is a viscous liquid difficult to handle at the reaction temperature. A solvent for the complex forming agent may be present if desired. Suitable solvents for the agent include water, alcohols and sulfolanes. However, the agent may be employed in solid form when contacted with the hydrocarbons, the latter then being in either gaseous or liquid state. It is preferred that an excess of the agent be present at all times in order to promote maximum complex formation. Additional agent may be added at any time during the formation process. Temperatures from about −30° to about 100° C. are preferred and the most suitable range of temperatures include 20 to 50° C. Hence, it will be seen that it is possible to operate the process at ordinary room temperatures.

The induction period required for complex formation will vary from a fraction of a minute to as much as several hours or even longer, dependent upon the numerous factors described hereinabove. As pointed out previously, it is the primary objective of the present invention to maintain the pH of the reaction mixture below 9.5 in order to reduce this induction period to a minimum. Once the crystalline complexes commence forming the reaction appears to be rapidly completed, crystals having excellent filtration characteristics being formed. Thereupon the crystals may be separated from the remaining components of the reaction mixture by such means as decantation, filtration or centrifuging. Subsequently the separated crystalline complexes may be regenerated by such means as heating, distillation, application of a solvent for the complex forming agent or addition of a solvent for the hydrocarbon. Upon application of any of these means the complexes decompose to yield the original organic compound and the complex forming agent which may be suitably separated and further processed or recycled. A preferred means of operating the process involves recycling the complex forming agent for the formation of further complexes. The following examples are included as specific embodiments of the invention.

Example I

One volume of a petroleum lubricating oil fraction having a 415–660° F. boiling range and containing 15% substantially straight chain hydrocarbons was mixed with four volumes of methyl isobutyl ketone. Urea was dissolved in water to form a saturated solution at 85° F. Five parts by volume of the diluted oil was mixed with 5 parts by volume of the urea solution at 85° F. The pH of the mixture was adjusted by the addition of acetic acid or ammonium hydroxide as required. The induction period (i. e. the length of time between initial mixing and crystal appearance) at a given pH was noted. A fresh batch was tested at each pH. The data obtained are given in the table below:

| pH | Induction Period |
|---|---|
|  | Minutes |
| 4.0 | 1.6 |
| 5.0 | 2.0 |
| 6.0 | 2.5 |
| 7.0 | 3.5 |
| 8.0 | 4.5 |
| 9.0 | 6.0 |
| 10.5 | 12.0 |

Example II

An aqueous urea solution, saturated at 90° F., was boiled for 58 hours. At the end of the boiling period the solution had a pH of 9.7. No complexes could be formed by contacting the solution with normal hydrocarbons. When, however, the pH was lowered to 7.0 with acetic acid the urea therein rapidly formed complexes with $C_{14}$–$C_{18}$ normal hydrocarbons.

Example III

A petroleum fraction having a boiling range of 415–660° F. containing 15% normal paraffins was treated with a saturated aqueous urea solution at 95° F. Parallel runs were made, at pH's 8.8 and 5.9, respectively. As indicated in the table below, samples were withdrawn periodically from each run to determine the amount of normal paraffins in the raffinate, i. e., that had not formed complexes with urea. The data obtained are given in the following table:

|  | Raffinate, Per Cent Normal Paraffins | |
|---|---|---|
| pH of System | 8.8 | 5.9 |
| Residence Time, minutes: |  |  |
| 1.0 | 2.00 | 0.9 |
| 2.5 | 1.15 |  |
| 4.0 | 0.86 |  |

I claim as my invention:

1. In a process for the formation of crystalline molecular complexes of urea and straight-chain hydrocarbons wherein an aqueous urea solution and a petroleum lubricating oil containing a substantial proportion of said straight-chain hydrocarbons are contacted to form said crystalline molecular complexes and wherein the pH of said aqueous urea solution tends to increase above 9.5, the improvement which comprises adding an amount of acetic acid sufficient to maintain the pH of said aqueous urea solution below 9.5.

2. In a process for the formation of crystalline molecular complexes of urea and straight-chain hydrocarbons wherein an aqueous urea solution and a petroleum lubricating oil containing a substantial proportion of said straight-chain hydrocarbons are contacted to form said crystalline molecular complexes and wherein the pH of said aqueous urea solution tends to increase above 9.5, the improvement which comprises adding an amount of acidic material sufficient to maintain the pH of said aqueous solution below 9.5.

3. In a process for the formation of crystalline molecular complexes of urea and straight-chain hydrocarbons wherein an aqueous urea solution and a petroleum lubricating oil containing a substantial proportion of said straight-chain hydrocarbons are contacted to form said crystalline molecular complexes and wherein the pH of said aqueous urea solution tends to increase above 8.0, the improvement which comprises adding an amount of fatty acid sufficient to maintain the pH of said aqueous solution below 8.0.

4. In a process for the formation of crystalline molecular complexes of urea and straight-chain hydrocarbons wherein an aqueous urea solution and a petroleum lubricating oil containing a substantial proportion of said straight-chain hydrocarbons are contacted to form said crystalline molecular complexes and wherein the pH of said aqueous urea solution tends to increase above 8.0, the improvement which comprises adding an amount of acidic material sufficient to maintain the pH of said aqueous urea solution below 8.0.

5. In the process for the formation of crystalline molecular complexes of thiourea and naphthenic hydrocarbons wherein an aqueous thiourea solution is contacted with said naphthenic hydrocarbons and wherein the pH of said aqueous thiourea solution tends to increase above 9.5, the improvement which comprises adding an amount of acidic material sufficient to maintain the pH of said aqueous thiourea solution below 9.5.

6. In the process for the formation of crystalline molecular complexes of thiourea and naphthenic hydrocarbons wherein an aqueous thiourea solution is contacted with said naphthenic hydrocarbons and wherein the pH of said aqueous thiourea solution tends to increase above 8.0, the improvement which comprises adding an amount of acidic material sufficient to maintain the pH of said aqueous thiourea solution below 8.0.

7. In a process for the formation of crystalline molecular complexes of urea and straight-chain hydrocarbons wherein an aqueous urea solution is contacted with said straight-chain hydrocarbons and wherein the pH of said aqueous urea solution tends to increase above 9.5, the improvement which comprises adding an amount of acidic material sufficient to maintain the pH of said aqueous urea solution below 9.5.

8. In the process for the formation of crystalline molecular complexes between hydrocarbons and an agent of the group consisting of urea and thiourea whereby crystalline molecular complexes of the group consisting of urea with substantially unbranched hydrocarbons, thiourea with branched hydrocarbons and thiourea with naphthenic hydrocarbons are formed wherein an aqueous solution of the agent is contacted with said hydrocarbons and the pH of said aqueous solution tends to increase above 9.5, the improvement which comprises adding an amount of acidic material sufficient to maintain the pH of said aqueous solution below 9.5.

9. In a process for the formation of crystalline molecular complexes of urea and straight-chain hydrocarbons wherein an aqueous urea solution is contacted with said straight-chain hydrocarbons and the pH of said aqueous urea solution tends to increase above 9.5, the improvement which comprises adding an amount of fatty acid sufficient to maintain the pH of said aqueous urea solution below 9.5.

10. In a process for the formation of crystalline molecular complexes of urea and straight-chain hydrocarbons wherein an aqueous urea solution is contacted with said straight-chain hydrocarbons and the pH of said aqueous urea solution tends to increase above 9.5, the improvement which comprises adding an amount of acidic material sufficient to maintain the pH of said aqueous urea solution between about 5 and about 8.

11. In the process for the formation of crystalline molecular complexes of thiourea with branched chain hydrocarbons wherein an aqueous thiourea solution is contacted with said hydrocarbons and wherein the pH of said aqueous thiourea solution tends to increase above 9.5, the improvement which comprises adding an amount of acidic material sufficient to maintain the pH of said aqueous thiourea solution below 9.5.

LLOYD C. FETTERLY.

REFERENCES CITED

The following references are of record in the file of this patent:

UNITED STATES PATENTS

| Number | Name | Date |
|---|---|---|
| 1,830,859 | Schotte | Nov. 10, 1931 |
| 2,011,292 | Koch | Aug. 13, 1935 |
| 2,047,144 | Kharasch | July 7, 1936 |
| 2,109,941 | D'Alelio | Mar. 1, 1938 |
| 2,131,127 | Ter Horst | Sept. 27, 1938 |
| 2,300,134 | Priewe | Oct. 27, 1942 |
| 2,321,544 | Dittmar et al. | June 8, 1943 |
| 2,376,008 | Riethof | May 15, 1945 |

FOREIGN PATENTS

| Number | Country | Date |
|---|---|---|
| 6,771 | Great Britain | of 1901 |
| 785,765 | France | May 27, 1935 |

OTHER REFERENCES

Baum: "Ber. deut. Chem.," vol. 41, (1908), page 528.

Atkins: "J. Chem. Soc." (London), vol. 101 (1912), pages 1988 to 1991.

Reynolds: "J. Chem. Soc." (London), vol. 59, trans. (1891), pages 387 to 392.

Singh et al.: "J. Chem. Soc." (London), vol. 119 (1921), pages 210 and 211.

Matignon: "Bull. Scr. Chim. Paris," Series 3, vol. 11 (1894), page 575.

Perktold: "Monatshefte für Chemie," vol. 56 (1930), page 248.

De Souze: "Chemical Abstracts," vol. 38 (1944), page 5043.

Benger: Photostat of Tech Oil Mission Reel 143, August 22, 1946.